United States Patent
Yukitake

(10) Patent No.: US 8,310,125 B2
(45) Date of Patent: Nov. 13, 2012

(54) MOTOR AND ELECTRIC PUMP HAVING A STATOR INCLUDING A FIRST SINTERED METAL AND SECOND SINTERED METAL

(75) Inventor: Yasuhiro Yukitake, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 135 days.

(21) Appl. No.: 12/449,641

(22) PCT Filed: Feb. 22, 2008

(86) PCT No.: PCT/JP2008/053017
§ 371 (c)(1),
(2), (4) Date: Aug. 19, 2009

(87) PCT Pub. No.: WO2008/102860
PCT Pub. Date: Aug. 28, 2008

(65) Prior Publication Data
US 2010/0040488 A1    Feb. 18, 2010

(30) Foreign Application Priority Data
Feb. 23, 2007  (JP) ................................ 2007-044529

(51) Int. Cl.
*H02K 1/18* (2006.01)
(52) U.S. Cl. .................................. 310/216.067; 310/44
(58) Field of Classification Search ........... 310/216.066, 310/216.067, 216.007, 44; 148/310
See application file for complete search history.

(56) References Cited

U.S. PATENT DOCUMENTS

| | | | | |
|---|---|---|---|---|
| 2,247,890 A | * | 7/1941 | Reardon | 310/216.007 |
| 3,848,331 A | * | 11/1974 | Pavlik et al. | 29/596 |
| 4,392,072 A | * | 7/1983 | Rosenberry | 310/216.067 |
| 4,947,065 A | * | 8/1990 | Ward et al. | 310/44 |
| 5,105,115 A | * | 4/1992 | Shinryo et al. | 310/216.067 |
| 5,710,474 A | * | 1/1998 | Mulgrave | 310/216.002 |
| 6,057,621 A | | 5/2000 | Suzuki et al. | |

(Continued)

FOREIGN PATENT DOCUMENTS
EP    1742327    *    1/2007
(Continued)

OTHER PUBLICATIONS

Machine Translation JP 07-111746, Takahashi et al. "Rotary Electric Machine", Apr. 25, 1995.*

(Continued)

*Primary Examiner* — Karl Tamai
(74) *Attorney, Agent, or Firm* — McGinn IP Law Group, PLLC

(57) ABSTRACT

In a motor comprising a stator and a rotor disposed in an inner circumference of the stator, the stator comprises a substantially cylindrical stator core and coils made up of wound conductors, and the stator core comprises an outer circumferential portion which constitutes an outer circumferential wall of the stator and an inner circumferential portion round which the conductors are wound. The outer circumferential portion is formed of a first sintered metal made of a powder magnetic material, while the inner circumferential portion is formed of a second sintered metal made of a powder magnetic material, and the first sintered metal is a sintered metal having a higher mechanical strength than the second sintered metal. Additionally, the stator core is formed by diffusion bonding the outer circumferential portion and the inner circumferential portion being bonded together.

15 Claims, 3 Drawing Sheets

U.S. PATENT DOCUMENTS

| | | | |
|---|---|---|---|
| 6,472,792 B1 * | 10/2002 | Jack et al. | 310/216.066 |
| 6,617,740 B2 * | 9/2003 | Petersen | 310/216.106 |
| 7,608,968 B2 * | 10/2009 | Toyoda et al. | 336/130 |
| 2003/0141774 A1 * | 7/2003 | Komura et al. | 310/156.43 |
| 2006/0145562 A1 | 7/2006 | Nakayama | |
| 2010/0040488 A1 * | 2/2010 | Yukitake | 417/410.1 |

FOREIGN PATENT DOCUMENTS

| | | | |
|---|---|---|---|
| JP | 07-111746 | * | 4/1995 |
| JP | 9-149567 | | 6/1997 |
| JP | 9-215230 | | 8/1997 |
| JP | 9-219950 | | 8/1997 |
| JP | 11-146616 | | 5/1999 |
| JP | 2003-219583 | | 7/2003 |
| JP | 2004-215495 | | 7/2004 |
| JP | 2004-254384 | | 9/2004 |
| JP | 2004-304904 | | 10/2004 |
| JP | 2005-322800 | | 11/2005 |
| JP | 2006-166679 | | 6/2006 |
| JP | 2006-223024 | | 8/2006 |
| JP | 2006-280066 | | 10/2006 |
| JP | 2006-304455 | | 11/2006 |
| WO | 2005060073 | * | 6/2005 |

OTHER PUBLICATIONS

Manual Translation JP 09-215230, Kishimoto, "Motor", Aug. 15, 1997.*

* cited by examiner

MOTOR AND ELECTRIC PUMP HAVING A STATOR INCLUDING A FIRST SINTERED METAL AND SECOND SINTERED METAL

TECHNICAL FIELD

The present invention relates to a motor and an electric pump.

BACKGROUND ART

Conventionally, an inner rotor-type motor like one described in JP-A-2006223024 is widely known in which a rotor is disposed in an inner circumference of a stator. More specifically, there is known a motor which comprises a state and a rotor disposed in an inner circumference of the stator, the motor comprising covers which cover axial end portions of the motor and a motor casing which covers an outer circumference of the motor (that is, an outer circumference of the stator), wherein the stator is press fitted in the motor casing.

In addition, in general, in inner rotor-type motors (hereinafter, referred to simply as a "motors"), there is known a so-called frame-less motor in which there is provided no motor casing which covers an outer circumference of the motor (for example, refer to JP-A-9-149567, JP-A-9-219950). More specifically, there is known a motor which comprises a stator and a rotor disposed in an inner circumference of the stator, the motor comprising brackets which cover axial end portions of the motor, wherein axial end portions of the stator are fixed to the brackets.

DISCLOSURE OF THE INVENTION

Problem that the Invention is to Solve

Incidentally, in the conventional motor which is configured to include the motor casing, since the outer circumference of the motor is covered by the motor casing, compared with the configuration in which the motor has no motor casing, the volume of the motor has to be increased by one thickness of the motor casing. Consequently, when attempting to reduce the size of a motor, it is desirable to use the motor having the configuration in which there is provided no motor casing.

In the conventional motor which has no motor casing, however, the outer circumference of the stator is exposed. Since the stator is generally intended to generate a magnetic field for rotating the rotor, the material of the stator is selected by paying as much attention as possible to magnetic properties such as permeability. Consequently, there occurs a situation where the stator has no desired mechanical strength, whereby the exposed outer circumference of the stator is damaged. When considering a situation like this, there has been a problem that the configuration has to be secured in which the motor includes the motor casing which covers the outer circumference of the stator, although the motor is made larger in size by the thickness of the motor casing.

Then, the invention has been made in view of the problem, and an object thereof is to provide a motor which is configured in such a manner that a stator can have a desired mechanical strength, whereby there has to be provided no member which covers an outer circumference of the motor so as to realize a reduction in size of the motor and an electric pump.

Means for Solving the Problem

According to a first aspect of the invention, there is provided a motor comprising a stator and a rotor disposed in an inner circumference of the stator, the stator comprising a substantially cylindrical stator core and coils made up of a wound conductor, the motor being characterized in that the stator core comprises an outer circumferential portion which configures an outer circumferential wall of the stator and an inner circumferential portion round which the conductor is wound, in that the outer circumferential portion is formed of a first sintered metal made of a powder magnetic material and the inner circumferential portion is formed of a second sintered metal made of a powder magnetic material, the first sintered metal being a sintered metal having a higher mechanical strength than the second sintered metal, and in that the stator core is formed by the outer circumferential portion and the inner circumferential portion being bonded together by diffusion bonding.

According to the above configuration, since the outer circumferential portion of the stator core is formed of the first sintered metal having the higher mechanical strength than the second sintered metal which forms the inner circumferential portion, compared with a case where the stator core is formed of the second sintered core only, the outer circumferential portion of the stator core is made difficult to be damaged. Consequently, by the outer circumferential portion of the stator core being given the mechanical strength which makes it difficult to be damaged, the configuration can be attained in which no motor casing (that is, no member which covers the outer circumference of the motor) is provided, thereby making it possible to make the motor smaller in size by one thickness of the motor casing, compared with the motor which is configured to include the motor casing which covers the outer circumference of the stator.

In addition, according to a second aspect of the invention, there is provided a motor as set forth in the first aspect, characterized in that the second sintered metal is a sintered metal which has a larger permeability than the first sintered metal.

According to the above configuration, since the inner circumferential portion of the stator core is formed of the second sintered metal having the larger permeability than the first sintered metal, compared with a case where the stator core is formed on the first sintered metal only, the stator core having better magnetic properties can be obtained. Consequently, the magnetic properties of the stator core can be improved, thereby making it possible to obtain the motor having good efficiency.

Additionally, according to a third aspect of the invention, there is provided an electric pump comprising a pump and a motor for driving the pump, characterized in that the motor is made up of the motor set forth in the first or second aspect of the invention.

According to the above configuration, since the motor of the electric pump is made up of the motor set forth in the first or second aspect of the invention, no member is required which covers an outer circumference of the motor, thereby making it possible to make the electric pump smaller in size by making the motor of the electric pump smaller in size.

ADVANTAGE OF THE INVENTION

According to the invention, the outer circumferential portion of the stator core can be given the desired mechanical strength, whereby a reduction in size of the motor can be realized by obviating the necessity of the member which covers the outer circumference of the motor.

BEST MODE FOR CARRYING OUT THE INVENTION (First Embodiment)

Hereinafter, a first embodiment into which the invention is embodied into a motor will be described based on FIGS. 1 and 2. This motor 10 is used as a drive source for auxiliaries such as a water pump, an oil pump and a transmission pump of a vehicle.

(Overall Configuration)

Figure 1:
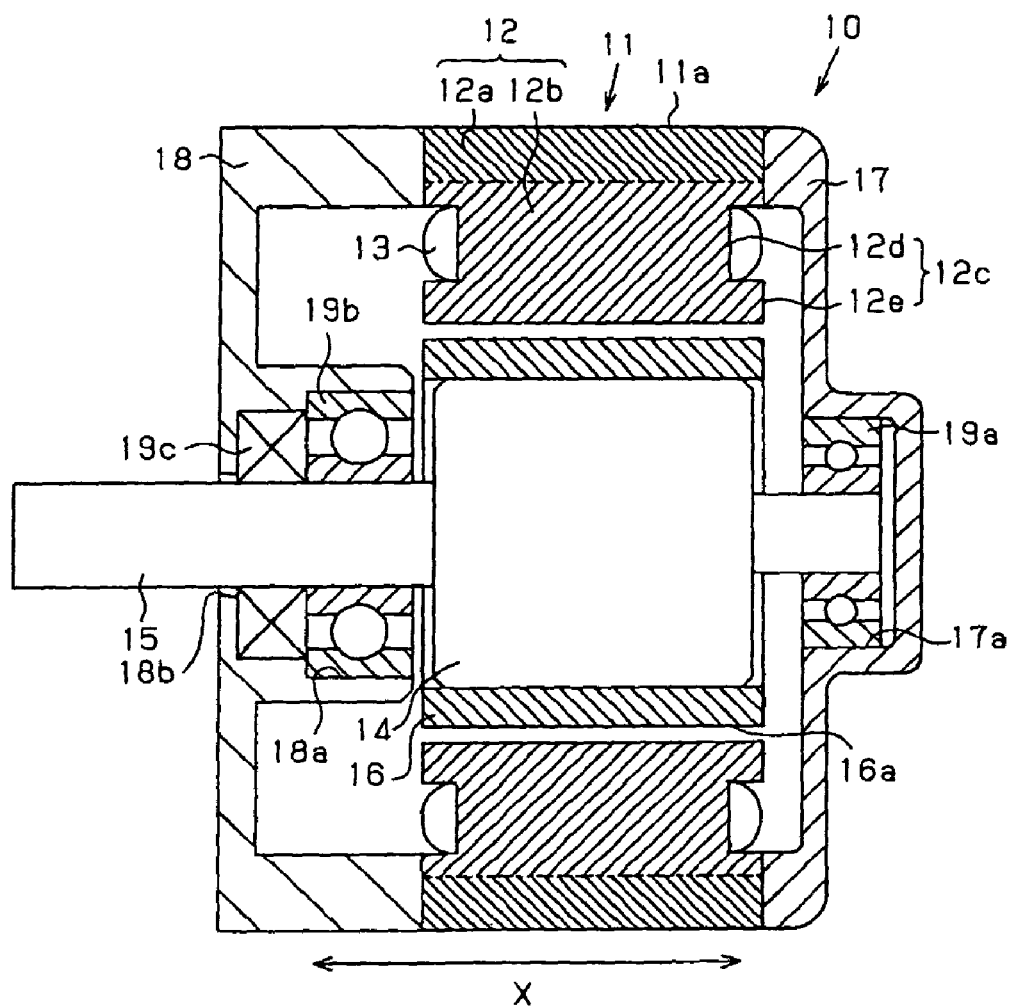
FIG. 1 is a partially sectional view of a motor according to an embodiment of the invention.

As is shown in FIG. 1, the motor 10 includes a stator 11, a rotor 14 which includes a shaft 15 and a permanent magnet 16 and covers 17, 18 which are disposed in such a manner as to cover axial (that is, directions indicated by arrows X) end portions of the stator 11 and the rotor 14. Further, the motor 10 includes bearings 19a, 19b which support the shaft 15 rotatably and a sealing device 19c which is provided near the bearing 19b.

Figure 2:
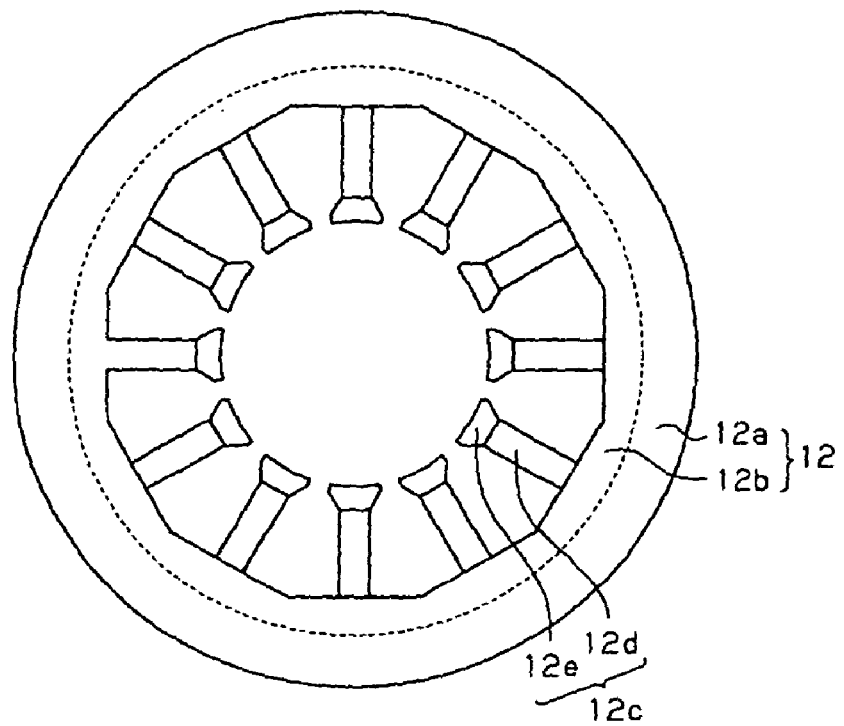
FIG. 2 is a plan view of a stator core.

As is shown in FIGS. 1 and 2, the stator core 11 is made up of a substantially cylindrical stator core 12 which is made to open at both axial ends thereof and coils 13 which is made up of wound conductors. The stator core 12 includes an outer circumferential portion 12a which makes up an outer circumferential wall 11a of the stator 11 and an inner circumferential portion around which the conductors are wound. In addition, the outer circumferential portion 12a is formed of a sintered metal M1 as a first sintered metal which is made up of a powder magnetic material, and the inner circumferential portion 12b is formed of a sintered metal M2 as a second sintered metal which is made up of a powder magnetic material. In addition, as is shown in FIG. 2, a plurality of (in this embodiment, 12) teeth 12c are provided, and as is shown in FIG. 1, axial end portions of parts 12d of the teeth 12c where conductors are wound round are recessed, compared with distal end portions 12e of the teeth 12c and axial end portions of the outer circumferential portion 12a. The coils 13 are formed by conductors being wound round the teeth 12c. In addition, the stator core 12 will be described in detail later in which the outer circumferential portion 12a and the inner circumferential portion 12b are formed by the sintered metals M1, M2 which are made of the different powder magnetic materials.

As is shown in FIG. 1, the rotor 14 is disposed in an inner circumference of the stator 11. The shaft 15 is disposed in the rotor 14 in such a manner as to penetrate through the rotor 14 while being fixed thereto, and a cylindrical permanent magnet 16 in which magnetic poles are magnetized alternately in a circumferential direction is fixed to an outer circumferential surface of the rotor. An outer circumferential surface 16a of the permanent magnet 16 and the inner circumferential portion 12b of the stator core 12 are made to face each other in such a manner as not to be brought into contact with each other. The rotor 14 is configured in the way described above, and the permanent magnet 16, the rotor 14 fixed to the permanent magnet 16 and the shaft 15 are caused to rotate by rotational magnetic fields which are generated by the coils 13 energized.

As is shown in FIG. 1, a bearing accommodating portion 17a is provided on the cover 17 which covers one end portions of the stator 11 and the rotor 14. In addition, a bearing accommodating portion 18a is provided on the cover 18 which covers the other end portions of the stator 11 and the rotor 14, and the cover 18 has a through hole 18b through which the shaft 15 penetrates. These covers 17, 18 which cover the axial end portions of the stator core 11 and the rotor 14 are connected to axial end faces of the stator core 12 with screws (not shown) or the like.

As is shown in FIG. 1, the bearings 19a, 19b which are accommodated in the bearing accommodating portions 17a, 18a, respectively, support the shaft rotatably, and the annular sealing device 19c made of an elastic member is provided between the cover 18 and the bearing 19b for preventing the entrance of foreign matters into the bearing 19b from a slight gap between the shaft 15 and the through hole 18b.

(Stator Core)

The aforesaid stator core 12 will be described in detail in which the outer circumferential portion 12a and the inner circumferential portion 12b are formed of the sintered metals M1, M2 which are made of the different powder magnetic materials.

The sintered metals which are made of the powder magnetic materials are sintered metals which formed by mixing a magnetic metallic powder such as an iron powder with a resin, molding the mixture by a press, and heating to harden (that is, sintering) the molded mixture. The resin is mixed in order to establish insulations between particles of the magnetic metallic powder.

Since the stator core 12, which is formed of the sintered metals which are made up of the powder magnetic materials formed as in the way described above, is molded by the press, compared with a stator core which is formed of a plurality of stacked electromagnetic steel sheets, a three-dimensional shape of the stator core 12 can easily be formed. In addition, in general, there is less iron loss in a high-frequency area in a stator core which is formed of a sintered metal made of a powder magnetic material like the ones described above than in a stator core which is formed of electromagnetic steel sheets. The sintered metal M1 and the sintered metal M2 which are made of these powder magnetic materials are bonded together through diffusion bonding.

The stator core 12 is formed by the outer circumferential portion 12a which is formed of the sintered metal M1 and the inner circumferential portion 12b which is formed of the sintered metal M2 being bonded together through diffusion bonding. The diffusion bonding is a method of bonding two metals together by making use of diffusion of atoms of the two metals which takes place at a portion where the two metals are brought into contact with each other by applying pressure and heat to where the two metals are in contact.

In addition, as the sintered metal M1 which is used for formation of the outer circumferential portion 12a, for example, a sintered metal is used which is formed by sintering a mixture in which powder of nickel or the like is added to a main constituent of iron powder and which has a higher mechanical strength than the sintered metal M2. For example, sintered metals specified as SMF 3 series, SMF 4 series and SMF 5 series under JIS are preferred.

Additionally, as the sintered metal M2 which is used for formation of the inner circumferential portion 12b, a sintered metal is used which is formed by sintering a metal powder which is mainly composed of iron powder in which particles whose particle diameters vary approximately from several tens to several hundreds μm are covered individually by an insulation film or iron and which has a larger permeability than the sintered metal M1. As this sintered metal, for example, soft magnetic composite materials are preferably used, and SOMALOY 500 (a product name) from HOGANAS AB or the like is preferred.

According to the motor of the first embodiment, the following advantages can be obtained.

(1) The stator core 12 includes the outer circumferential portion 12a which constitutes the outer circumferential wall of the stator 11 and the inner circumferential portion 12b round which the conductors are wound, and the outer circumferential portion 12a is formed of the sintered metal M1 made of the powder magnetic material, while the inner circumferential portion 12b is formed of the sintered metal M2 made of the powder magnetic material. In addition, the sintered metal M1 is the sintered metal having the higher mechanical strength than the sintered metal M2. Consequently, since the outer circumferential portion 12a of the stator core 12 is formed of the sintered metal M1 which has the higher mechanical strength than the sintered metal M2 which forms the inner circumferential portion 12b, compared with the case where the stator core 12 is formed on the sintered metal M2 only, the outer circumferential portion 12a of the stator core 12 is made difficult to be damaged. Consequently, by the outer circumferential portion 12a of the stator core 12 being given the mechanical strength which makes the outer circumferential portion 12a difficult to be damaged, the configuration can be attained in which there is provided no motor casing (the member which covers the outer circumference of the motor), whereby the motor 10 can be made smaller in size by one thickness of the motor casing, compared with the motor which is configured to include the motor casing which covers the outer circumference of the stator 11.

The sintered metal M2 is the sintered metal M2 which has the larger permeability than the sintered metal M1. Consequently, since the inner circumferential portion 12b of the stator core 12 is formed of the sintered metal M2 which has the larger permeability than the sintered metal M1 which forms the outer circumferential portion 12a, compared with the case where the stator core 12 is made of the sintered metal M1 only, the stator core 12 can be obtained which has better magnetic properties. Consequently, the magnetic properties of the stator core 12 can be improved, thereby making it possible to obtain the motor 10 having good efficiency.

(Second Embodiment)

Next, a second embodiment will be described in which the invention is embodied into an electric pump. This electric pump is used, for example, as auxiliaries such as a water pump, an oil pump and a transmission pump of a vehicle. Note that like reference numerals will be given to like constituent members to those of the first embodiment, and a detailed description thereof will be omitted.

(Overall Configuration)

Figure 3:
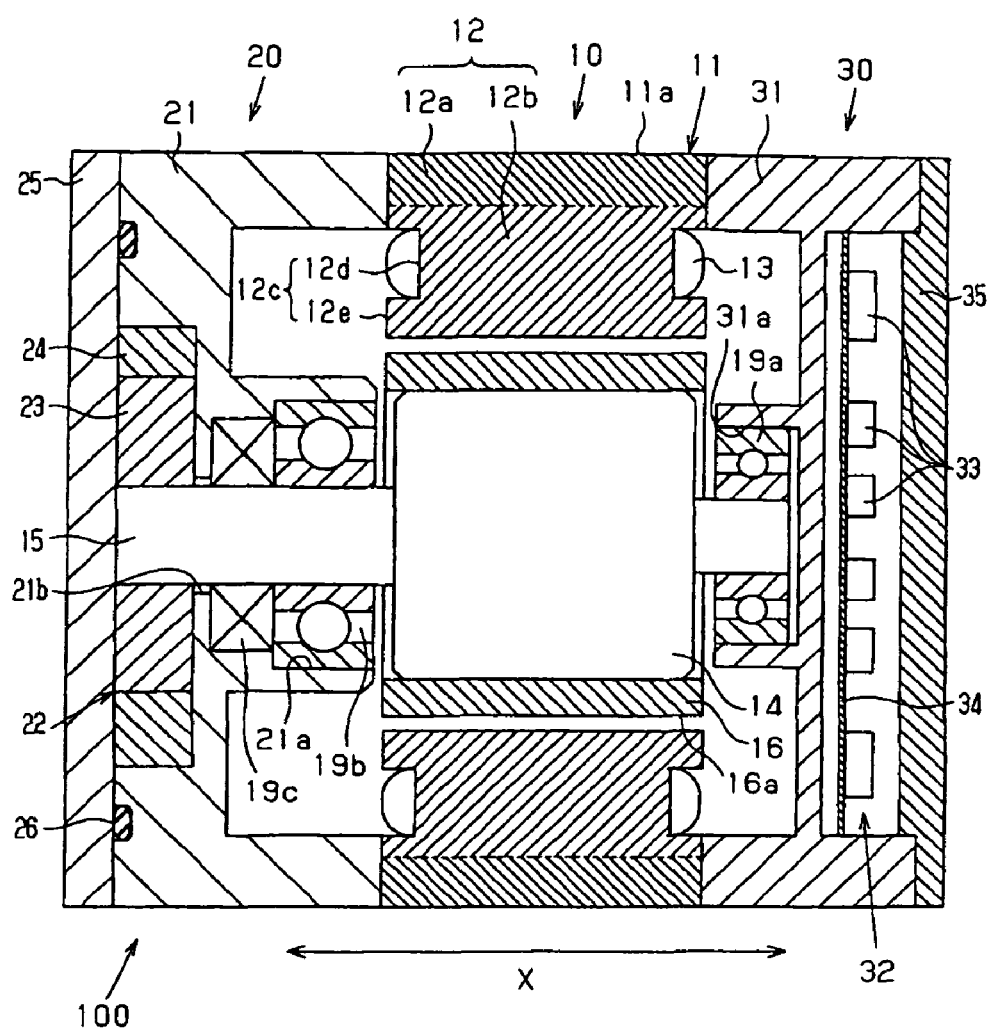
FIG. 3 is a partially sectional view of an electric pump according to another embodiment of the invention.

As is shown in FIG. 3, an electric pump 100 includes a motor 10 as a drive source for the electric pump 100, a pump 20 which is driven by driving the motor 10 and a controller 30 for controlling the driving of the motor 10. The pump 20 is provided at an axial end portion of the motor 10, and the controller 30 is provided at the other axial end portion of the motor 10.

(Configuration of Motor)

As is shown in FIG. 3, the motor 10 includes a rotor 14 which includes a shaft 15 and a permanent magnet 16. Further, the motor 10 includes bearings 19a, 19b which support rotatably the shaft 15 and a sealing device 19c which is provided near the bearing 19b. In addition, the stator 11 is made up of a stator core 12 and coils 13. As in the first embodiment that has been described above, the stator core 12 includes an outer circumferential portion 12a which constitutes an outer circumferential wall 11a of the stator 11 and an inner circumferential portion 12b round which conductors are wound. In addition, the stator core 12 is formed by the outer circumferential portion 12a which is formed of a sintered metal M1 which is made of a powder magnetic material and the inner circumferential portion 12b which is formed of a sintered metal M2 which is made of a powder magnetic material being bonded together through diffusion bonding.

(Configuration of Pump)

As is shown in FIG. 3, the pump 20 is made up of a pump housing 21 which covers the one axial end portion of the motor 10, an inner gear 23 which is accommodated within a pump compartment 22, an outer gear 24 which meshes with the inner gear 23 for rotation, and a pump plate 25 which covers an axial end portion of the pump housing 21.

A bearing accommodating portion 21a for accommodating the bearing 19b and a through hole 21b through which the axially extended shaft 15 is passed are provided in the pump housing 21. The sealing device 19c is provided between the through hole 21b and the bearing 19b, so as to inhibit the entrance of a fluid into the bearing 19b from a slight gap between the shaft 15 and the through hole 21b.

Since the inner gear 23 which is accommodated within the pump housing 21 is fixed to the shaft 15 which is provided to extend from the rotor 14, the inner gear 23 rotates together with the rotor 14. In addition, the outer gear 24 meshes with the inner gear 23 for rotation. Rotational shafts of the inner gear 23 and the outer gear 24 are eccentric, and the numbers of teeth of the inner gear 23 and the outer gear 24 are different. Because of this, space portions are formed between the inner gear 23 and the outer gear 24, and the volumes of the space portions vary as the inner gear 23 and the outer gear 24 rotate. The space portion whose volume is increased to reduce the pressure therein as the inner gear 23 and the outer gear 24 rotate is connected to an inlet port (not shown), while the space portion whose volume is reduced to increase the pressure therein as the inner gear 23 and the outer gear 24 rotate is connected to an outlet port (not shown). Consequently, a fluid which flows in from the inlet port flows out towards the outlet port by way of the spaces portions in the pump 20. As the pump having the mechanism like what has just been described, there is known an internal gear pump in which a trochoid or involute is applied to the shape of gear teeth thereof.

In addition, the pump plate 25 is fixed to the pump housing 21, and an annular seal member 26 is provided between the pump housing 21 and the pump plate 25. Since this seal member 26 is pressed against the pump housing 21 to thereby be compressed, the fluid-tightness between the pump housing 21 and the pump plate 25 is ensured.

(Configuration of Controller)

As is shown in FIG. 3, the controller 30 is made up of a housing which covers the other axial end portion of the motor 10, a controller accommodating portion 32, a controller circuit board 34 on which electronic components 33 are installed and a controller cover 35 which covers the controller circuit board 34.

In the housing 31A, a bearing accommodating portion 31a for accommodating the bearing 19a is provided and a controller accommodating portion 32 for accommodating the controller circuit board 34 is formed. Additionally, since a controller cover 35 is fixed to the housing 31 in such a manner as to cover the controller circuit board 34 which is accommodated within the controller accommodating portion 32, the waterproofness and mud proofing properties of the controller circuit board 34 and the electronic components 33 are ensured.

When the motor 10 is driven based on a command from the controller circuit board 34 of the controller 30, the inner gear 23 rotates at a desired speed together with the shaft 15, and in conjunction with this, the outer gear 24 also rotates. Then, as has been described above, in the pump 20, a fluid (for example, a fluid such as fuel, water, oil or the like) which has flowed thereinto from the inlet port flows out towards the outlet port in a desired amount per unit time.

According to the electric pump of the second embodiment that has just been described, the following advantage can be obtained.

Since the electric pump 100 includes the pump 20 and the motor 10 for driving the pump 20 and the motor 10 is made up of the motor which has the same configuration as that described in the first embodiment, the motor 10 having the advantages described above under (1) to (2) can be obtained. Consequently, since no member which covers the outer circumference of the motor 10 is required, the motor 10 of the electric pump 100 can be made smaller in size, and hence, the electric pump 100 can be made smaller in size.

Note that the embodiment may be modified as below.

In the second embodiment, although the pump 20 is the internal gear pump which is made up of the inner gear and the outer gear 24, the pump 20 may be an external gear pump.

The invention claimed is:

1. A motor comprising:
    a stator including a substantially cylindrical stator core and a coil round which a conductor is wound; and
    a rotor disposed in an inner circumference of the stator,
    wherein the stator core comprises:
        an outer circumferential portion which includes an outer circumferential wall of the stator; and
        an inner circumferential portion round which the conductor is wound,
    wherein the outer circumferential portion is formed of a first sintered metal comprising a powder magnetic material, and the inner circumferential portion is formed of a second sintered metal comprising a powder magnetic material,
    wherein the first sintered metal comprises a sintered metal having a higher mechanical strength than the second sintered metal, and
    wherein the outer circumferential portion and the inner circumferential portion comprise a common diffusion bonded junction.

2. The motor according to claim 1, wherein the second sintered metal comprises a sintered metal which has a permeability greater than a permeability of the first sintered metal.

3. An electric pump comprising a pump and a motor for driving the pump, wherein the motor comprises the motor set forth in claim 1.

4. The motor according to claim 1, wherein the inner circumferential portion includes teeth around which the conductor is wound.

5. The motor according to claim 1, wherein the second sintered metal comprises iron powder and resin.

6. The motor according to claim 1, wherein the first sintered metal comprises iron powder and resin.

7. The motor according to claim 1, wherein the first sintered metal comprises nickel.

8. The motor according to claim 1, wherein the first sintered metal comprises a metal having a mechanical strength greater than a mechanical strength of a metal of the second sintered metal.

9. The motor according to claim 1, wherein the first sintered metal comprises nickel, iron and resin.

10. The motor according to claim 1, wherein the inner circumferential portion continuously borders an inner surface of the outer circumferential portion.

11. The motor according to claim 4, wherein the inner circumferential portion contiguously extends around a circumference of the rotor such that at least a portion of the inner circumferential portion is disposed, in a radial direction, between the teeth and the outer circumferential portion.

12. The motor according to claim 1, wherein the first sintered metal comprises a powder magnetic material different from a powder magnetic material of the second sintered metal.

13. The motor according to claim 1, further comprising an end cover which covers end portions of the stator and rotor and is fixed to axial end faces of the stator.

14. The motor according to claim 1, wherein the first sintered metal comprises a powder magnetic material which is absent in the second sintered metal.

15. The electric pump according to claim 3, wherein the outer circumferential wall of the stator comprises an outer wall of the electric pump.

* * * * *